(12) United States Patent
Biebach et al.

(10) Patent No.: US 10,556,659 B2
(45) Date of Patent: Feb. 11, 2020

(54) BOAT WITH ELECTRIC DRIVE

(71) Applicant: Torqeedo GmbH, Gilching (DE)

(72) Inventors: Jens Biebach, Tutzing (DE); Philipp Krieger, Feldafing (DE); Marc Hartmeyer, Munich (DE)

(73) Assignee: Torqeedo GmbH, Gilching (DE)

( * ) Notice: Subject to any disclaimer, the term of this patent is extended or adjusted under 35 U.S.C. 154(b) by 198 days.

(21) Appl. No.: 14/442,058

(22) PCT Filed: Nov. 11, 2013

(86) PCT No.: PCT/EP2013/003394
§ 371 (c)(1),
(2) Date: May 11, 2015

(87) PCT Pub. No.: WO2014/072073
PCT Pub. Date: May 15, 2014

(65) Prior Publication Data
US 2015/0266558 A1    Sep. 24, 2015

(30) Foreign Application Priority Data
Nov. 12, 2012   (DE) .................. 10 2012 021 996

(51) Int. Cl.
*B63H 21/36* (2006.01)
*H01M 10/0525* (2010.01)
(Continued)

(52) U.S. Cl.
CPC .............. *B63J 3/04* (2013.01); *B63H 20/007* (2013.01); *B63H 20/12* (2013.01); *B63H 21/17* (2013.01);
(Continued)

(58) Field of Classification Search
None
See application file for complete search history.

(56) References Cited

U.S. PATENT DOCUMENTS 3,834,942 A * 9/1974 Tietze ............... H01M 2/02
                                              429/174
3,835,625 A * 9/1974 Williams ............ B01D 47/00
                                              110/119
(Continued)

FOREIGN PATENT DOCUMENTS

CN         1670987 A      9/2005
CN       101662054 A      3/2010
(Continued)

OTHER PUBLICATIONS

U.S. patent application, "Electrical Accumulator with Water Sensor", U.S. Appl. No. 14/442,047, filed May 11, 2015, First named inventor: Marc Hartmeyer et al.
(Continued)

*Primary Examiner* — Barbara L Gilliam
*Assistant Examiner* — Zhongqing Wei
(74) *Attorney, Agent, or Firm* — Crowell & Moring LLP

(57) ABSTRACT

A boat has a battery located within an interior of a battery-housing, which includes a waste gas outlet that has a gas-permeable seal and a pressure relief valve. The battery housing is gastight and watertight with the exception of the waste gas outlet. The gas-permeable seal is water-impermeable and comprises a semi-permeable diaphragm that allows the passage of water vapor out from the interior of the battery housing, but prevents the passage of water vapor into the interior of the battery housing.

15 Claims, 5 Drawing Sheets

(51) Int. Cl.
*B63H 21/17* (2006.01)
*B63J 3/04* (2006.01)
*B63H 20/00* (2006.01)
*B63H 23/24* (2006.01)
*H01M 2/12* (2006.01)
*B63H 20/12* (2006.01)
*H01H 47/00* (2006.01)

(52) U.S. Cl.
CPC ............ *B63H 21/36* (2013.01); *B63H 23/24* (2013.01); *H01H 47/00* (2013.01); *H01M 2/1223* (2013.01); *H01M 10/0525* (2013.01); *H01M 2220/20* (2013.01)

(56) References Cited

U.S. PATENT DOCUMENTS

| | | | |
|---|---|---|---|
| 4,345,611 A | | 8/1982 | Ikeda et al. |
| 9,224,997 B2* | | 12/2015 | Osswald ............. H01M 2/1022 |
| 2010/0052692 A1* | | 3/2010 | Yano ................... H01M 2/1083 |
| | | | 324/427 |
| 2011/0056758 A1 | | 3/2011 | Hoh et al. |
| 2012/0247338 A1* | | 10/2012 | Bauer ................. H01M 2/1241 |
| | | | 96/6 |

FOREIGN PATENT DOCUMENTS

| CN | 102017225 A | | 4/2011 |
|---|---|---|---|
| CN | 102738524 A | | 10/2012 |
| DE | 30 21 426 A1 | | 12/1980 |
| EP | 1 091 431 A2 | | 4/2001 |
| JP | 2001110377 A | * | 4/2001 |
| JP | 2006182264 A | * | 7/2006 |
| WO | WO 2014/072070 A1 | | 5/2014 |
| WO | WO 2014/072071 A1 | | 5/2014 |
| WO | WO 2014/072072 A1 | | 5/2014 |
| WO | WO 2014/072074 A1 | | 5/2014 |

OTHER PUBLICATIONS

U.S. patent application, "Boat with High-Voltage System", U.S. Appl. No. 14/442,051, filed May 11, 2015, First named inventor: Jens Biebach et al.
U.S. patent application, "Boat with Electric Drive", U.S. Appl. No. 14/442,056, filed May 11, 2015, First named inventor: Jens Biebach et al.
U.S. patent application, "Boat with Electric Drive and Emergency Off Switch", U.S. Appl. No. 14/442,062, filed May 11, 2015, First named inventor: Jens Biebach et al.
PCT/EP2013/003394, International Search Report dated Mar. 4, 2014 (Two (2) pages).
Chinese Office Action issued in Chinese counterpart application No. 201380058930.9 dated Sep. 2, 2016, with English translation (Eighteen (18) pages).
Chinese Office Action issued in Chinese counterpart application No. 201380058903.9 dated Apr. 19, 2017, with English translation (Nineteen (19) pages).

* cited by examiner

BOAT WITH ELECTRIC DRIVE

This application claims the priority of International Application No. PCT/EP2013/003394, filed Nov. 11, 2013, and German Patent Document No. 10 2012 021 996.2, filed Nov. 12, 2012, the disclosures of which are expressly incorporated by reference herein.

BACKGROUND AND SUMMARY OF THE INVENTION

The invention relates to a boat having a battery that is located in a battery housing.

Boats with electric drive have on-board batteries as energy store. In this case lithium-ion batteries are preferred energy stores for electric drive systems on boats. Depending on the required quantity of energy, required voltage level of the drive system, used cell chemistry and cell capacity, the battery is formed as a series connection of individual cells.

For safe use of a battery, in particular a lithium-ion battery, on board a boat it is necessary to use a battery management system which ensures that the battery can be operated only within the safe limits thereof. Depending on the type of boat, the protection of the battery against environmental influences varies and the delimitation with respect to spaces in which people reside also varies.

With use on a boat the components are exposed to an increased atmospheric humidity and sometimes also to splashed water. The increased atmospheric humidity can lead, together with alternating heating and cooling, as is typical for battery operation, to the condensation of the atmospheric moisture within the battery. This condensation can in turn lead to corrosion and may also have an adverse effect on insulation gaps.

Batteries that are designed for use on boats are to be watertight in accordance with protection class IP67. In the case that water infiltrates the boat or in the case of an accident, no live parts must come into contact with the water. To comply with this protection standard the battery is provided with a watertight battery housing.

In the case of a completely tight battery housing, temperature changes cause a pressure difference between the battery interior and the surrounding environment. The pressure difference may lead to a loading of the seals until said seals fail and/or the battery housing deforms.

The object of the present invention is therefore to develop a boat having a battery, wherein the above-mentioned problems are to be prevented.

This object is achieved by a boat having a battery located in a battery housing and which is characterized in that the battery housing is provided with a waste gas outlet, and in that the battery housing is gastight and watertight with the exception of the waste gas outlet, and in that the waste gas outlet comprises a gas-permeable seal, in particular a diaphragm, and a pressure relief valve and in that the gas-permeable seal is water-impermeable and is formed as a semi-permeable diaphragm, which allows the passage of water vapor out from the interior of the battery housing, but prevents the passage of water vapor into the interior of the battery housing.

As described above, in the case of a completely tight battery housing temperature changes may cause a pressure difference between the interior of the battery housing and the surrounding environment. To compensate for this pressure difference a gas exchange is necessary between the interior and the exterior of the battery housing. This gas exchange may occur slowly, since in normal operation the pressure difference also only builds up slowly. In accordance with the invention the gas exchange is made possible in that the battery housing has a waste gas outlet, which in turn comprises a gas-permeable seal, in particular a seal that is gas-permeable in both directions.

A battery is formed from a plurality of battery cells connected in series and/or parallel. Should there be a fault of the battery management system, there is the risk that a battery cell will be damaged. In this case it is to be ensured that the damage of the battery cell does not lead to any injuries to people. In addition the damage of the individual cell should not involve any damage of the adjacent battery cells, of the other battery components, or other units of the drive system or of the boat.

In the unlikely event that a lithium-ion cell is overloaded or other damage occurs at one of the battery cells, there is the risk that a relatively large amount of corrosive and poisonous gas will be suddenly produced. The gas formation results in a pressure increase in the interior of the battery cell, which can suddenly destroy the battery housing. This would result in an explosion of the battery cell. In order to avoid the explosive, uncontrolled destruction of the housing of the battery cell, the battery cells have a predetermined breaking point, which opens at a defined cell internal pressure, before the rest of the cell housing can be destroyed.

The gas escaping from the battery cell in such an event passes into the battery housing, generally cannot be removed quickly enough via the gas-permeable seal of the waste gas outlet, and leads to a pressure rise in the battery housing.

In accordance with the invention the waste gas outlet of the battery housing therefore additionally has a pressure relief valve, which opens from a certain pressure and discharges gas from the interior of the battery housing. In this way an explosion of the battery housing or of the battery is effectively prevented.

The poisonous vapours that may form in such a case of damage are heavier than air and could therefore collect in the boat interior following the exit from the battery. It is therefore advantageous to provide a selective removal of the gases from the waste gas outlet, in particular from the pressure relief valve. To this end a waste gas line is connected to the waste gas outlet, via which line gases and vapours from the interior of the battery housing can be conveyed to a point at which said gases and vapours can be safely discharged, in particular to a point outside the boat. The poisonous vapours are released for example into the air or into the water, such that there is no health risk posed by the gases and vapours to the occupants of the boat. The waste gas line is preferably formed as a flexible tube.

The invention is suitable in particular for boats that are equipped with lithium-ion batteries, for example boats with electric drive. The invention is used in particular for batteries that serve to supply energy to an electric drive of a boat, for example for batteries having a charge of more than 20 Ah, for example 20 to 50 Ah, or more than 50 Ah, for example 50 to 100 Ah, or from 100 to 150 Ah, and preferably for batteries according to protection class IP67.

The gas-permeable seal may be formed as a semi-permeable diaphragm. For pressure compensation the infiltration of air into the battery housing in the event of cooling is made possible via the seal, the semi-permeable diaphragm, however, constituting a barrier for the atmospheric moisture present in the air. This means that water vapour cannot pass into the interior of the battery housing via the diaphragm. When the internal air escapes, which occurs as the battery heats up, the diaphragm does not put up any resistance or only puts up little resistance to the atmospheric moisture that is located in the interior of the battery housing.

So that the gas can be removed completely from the battery into an uncritical region, the waste gas line is connected as tightly as possible to the exhaust gas outlet, in particular to the pressure relief valve. To this end the waste gas outlet has, advantageously at the point of the gas-permeable seal and the pressure relief valve, a flange that has a threaded connection or a clamped connection in order to tightly fasten the waste gas line.

The gas-permeable seal, for example a diaphragm, and the pressure relief valve are preferably arranged side by side at the waste gas outlet. The battery housing may also have a first waste gas outlet with gas-permeable seal, via which a gas exchange between the interior of the battery housing and the surrounding environment can take place during normal operation of the accumulator. In addition a second waste gas outlet with pressure relief valve can be provided, which is used in the event of damage to reduce an increased pressure in the battery housing.

The gas-permeable seal is advantageously watertight or impermeable to water so as to prevent the infiltration of water into the battery housing. The pressure relief valve is any case closed in normal operation and opens only in the event of damage, in which case a high gas pressure prevails in the battery housing. The interior of the battery housing is kept dry in this way.

The pressure relief valve can be formed for example by a stopper that is introduced into a press-in opening in the battery housing. The press-in surface of the stopper is designed such that the stopper at a certain pressure level is pushed out from the press-in opening and thus assumes the function of a pressure relief valve. The pressure trigger threshold can be set by the cross-sectional area of the stopper and the plug-in force with which the stopper plugs into a press-in opening in the battery housing.

In another embodiment the pressure relief valve is formed as a rupture disc, which is destroyed when a predefined rupture pressure is exceeded and releases an outlet opening.

The gas-permeable seal and the pressure relief valve can also be combined to form a unit. By way of example, a stopper in the core region can have a diaphragm for continuous pressure compensation.

The material of the waste gas line is selected such that it withstands the temperature of the gas for the duration of the outflow. The cross section of the waste gas line is selected to be of such a size that the quantity of gas can escape quickly enough, without resulting in an inadmissible pressure rise in the battery housing. When determining the cross section of the waste gas line, the length of the waste gas line is also taken into consideration in particular. The longer the waste gas line, the larger will be the cross section so as to avoid an increase of the flow resistance, which could lead to a critical pressure rise in the battery housing.

In one embodiment of the invention the waste gas lines are connected to a number of batteries, for example with Y- or T-pieces, to form a common waste gas manifold, such that only the waste gas manifold has to be guided out from the boat hull. The spatial requirement is thus minimized on the one hand, and on the other hand the installation costs are lowered. Under the assumption that there is no simultaneous discharge from cells in different batteries, waste gas manifolds and individual waste gas lines can have the same cross section.

With the use of a waste gas manifold to which two or more batteries are connected, the respective pressure relief valves and gas-permeable seals of the individual batteries are preferably formed such that they can withstand a pressure rise in the waste gas manifold that would be produced by the discharge of gas from an adjacent battery, without impairing the function.

The gas-permeable seal should not normally be exposed to continuous water load. Measures are therefore advantageously taken to prevent the infiltration of water into the waste gas line. For this purpose the waste gas line for example is provided at the outlet opening thereof, i.e. at the point at which the gases leave the waste gas line, with a check valve, which has a negligible flow resistance with respect to the gas. The valve, however, prevents the infiltration of water, which is splashed from outside against the opening, into the waste gas line. It is also possible to provide a different seal that is gas-permeable bidirectionally, but prevents the passage of water.

An alternative for the protection of the waste gas line against infiltrating water lies in designing and/or arranging the waste gas line such that at least one portion of the waste gas line is higher than the outlet opening thereof. The waste gas line is initially guided sufficiently far upwardly at a suitable angle, for example in the boat interior, such that the kinetic energy of water splashing against the outlet opening of the waste gas line can be reduced in the rising waste gas line and flows back before said water reaches the highest point of the waste gas line.

In order to protect against condensation water and in order to protect against small quantities of water that infiltrate the waste gas line in spite of the check valve and/or the rising waste gas line, it is favourable to guide the waste gas line deep enough prior to the connection to the battery housing or to the waste gas outlet of the battery housing that the water cannot advance as far as the waste gas outlet, but collects at this deepest point.

It is also favorable to provide a water outlet opening at this deep point so that infiltrating water can escape again from there or can be removed from there. The cross section of the water outlet opening is selected so as to be small compared with the cross section of the waste gas line, such that the water indeed flows off, but in the case in which gas is discharged from the battery housing only negligible quantities of the gas can reach the boat interior.

In order to prevent or reduce the discharge of battery gases via the water outlet opening into the boat interior, it is also favourable to provide the water outlet opening with a device for throughflow limitation, such that in the event of damage the quantity of gas escaping via the water outlet opening can be controlled.

The water outlet opening is preferably provided in the waste gas line such that in the case of the gas discharge from the battery housing ambient air is sucked in from the water discharge opening in accordance with the jet pump principle and cell gas from the battery housing cannot escape via the water outlet opening.

It is also possible to provide the water outlet opening with a maintenance closure that can be opened regularly to discharge collected water. The opening and closure of the maintenance closure is advantageously automated via a control device. The maintenance closure is opened for example in a time-controlled manner or when the water in the waste gas line has exceeded a certain quantity.

The invention and further details of the invention will be explained in greater detail on the basis of the schematic drawings.

BRIEF DESCRIPTION OF THE DRAWINGS

FIG. 3-4 show an embodiment of the pressure relief valve.

DETAILED DESCRIPTION OF THE DRAWINGS

Figure 1:
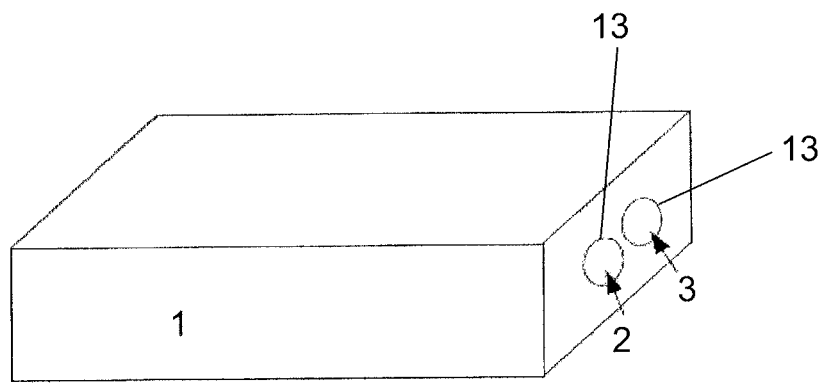
FIGS. 1-3 show a battery according to the invention.

In FIG. 1 the battery housing 1 of a battery used in a boat is illustrated schematically. The battery is provided with a gastight and watertight battery housing 1 in accordance with protection class IP67. In the event of a temperature rise, a pressure rise in the battery housing 1 may be caused. In accordance with the invention a gas-permeable seal 2 is therefore provided in an opening of the battery housing 1. The gas-permeable seal 2 is formed as a semi-permeable diaphragm, which allows gas to pass through in both directions, i.e. from the battery housing 1 to the surrounding environment and from the surrounding environment into the battery housing 1. By contrast, the diaphragm 2 is permeable to water vapour only in the direction out from the battery housing 1.

The diaphragm 2 thus enables the compensation of pressure differences between the interior of the battery housing 1 and the surrounding environment, which in particular are caused by temperature change.

Besides the diaphragm 2, a pressure relief valve 3 is provided in an opening 13 of the battery housing 1, which then only opens when the pressure in the interior of the battery housing 1 exceeds a predefined minimum pressure. The combination of diaphragm 2 and pressure relief valve 3 thus enables the compensation of the temperature-induced pressure difference between the interior of the battery housing 1 and the surrounding environment in normal operation and the compensation of a sudden pressure rise in the battery housing 1 in the case of a malfunction or damage at one of the battery cells.

The gases exiting from the battery housing 1 are collected in a waste gas line 4 and discharged from the boat. To this end, the waste gas line 4 is fastened to a connection piece 5, which covers the gas-permeable seal 2 and the pressure relief valve 3. The gas exiting from the seal 2 or the pressure relief valve 3 is guided into the waste gas line 4. Conversely, in the case of a negative pressure in the battery housing 1, gas can be guided via the waste gas line 4 and the seal 2 into the battery housing 1.

Figure 3:
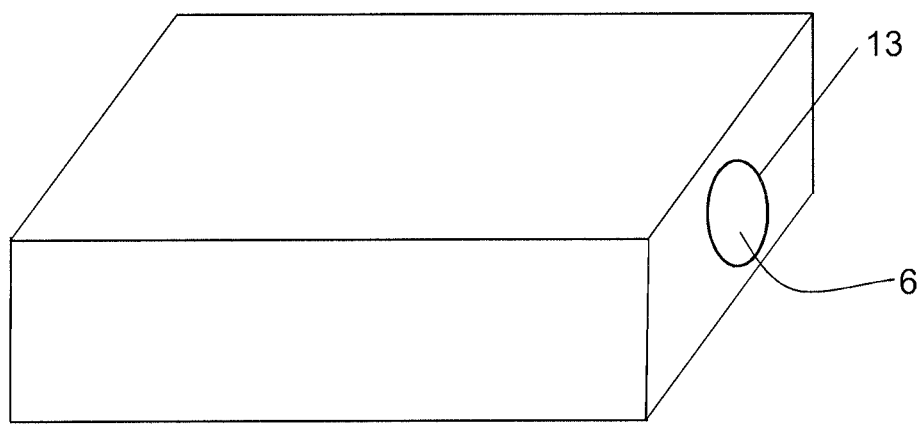
Figure 4:
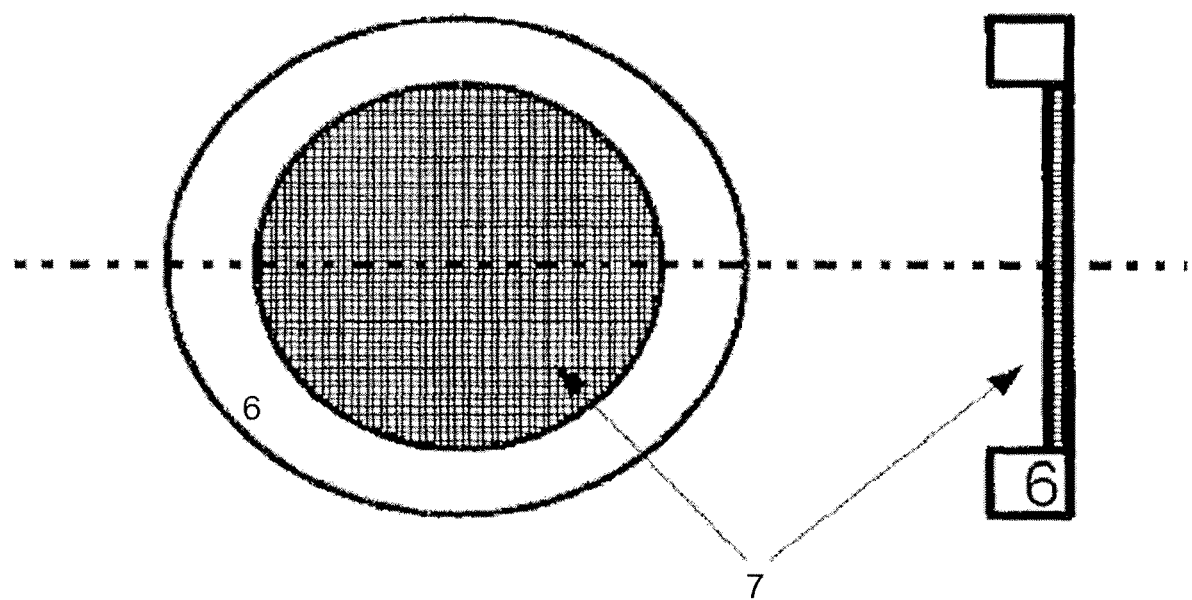

FIGS. 3-4 show an embodiment wherein the seal 2 and the pressure relief valve 3 are combined in a seal element 6. The seal element 6 is formed as a stopper, which is introduced into a corresponding press-in opening 13 in the battery housing 1. If the pressure in the interior of the battery housing 1 rises too sharply, the stopper 6 will thus be pushed out from the press-in opening 13 and the press-in opening will be released, such that the overpressure in the battery housing 1 can be quickly reduced.

The stopper 6 is annular and in the central area thereof has a diaphragm 7. The diaphragm 7 is gas-permeable and allows the pressure compensation with slow pressure rises, as can occur in normal operation for example on account of temperature changes.

Figure 2:
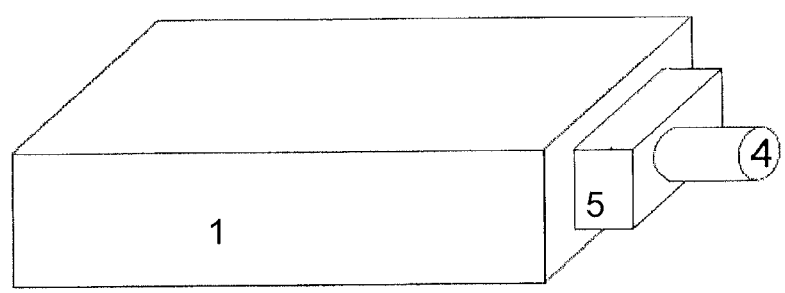
Figure 5:
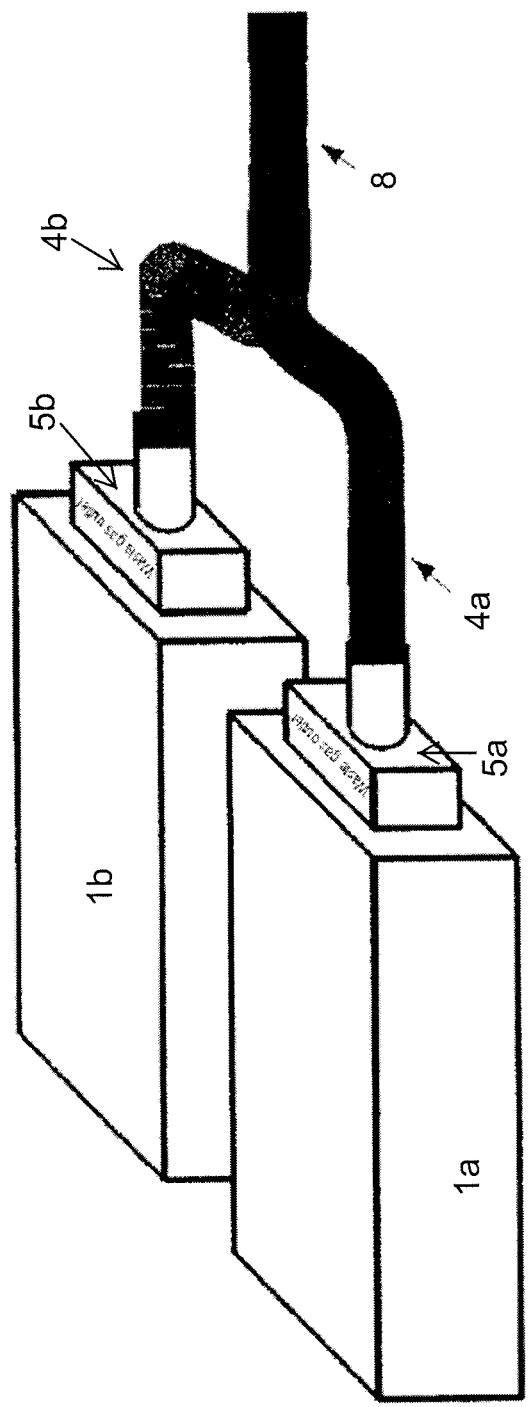
FIG. 5 shows an embodiment of the invention with a number of batteries.

FIG. 5 shows an arrangement of two batteries and battery housings 1a, 1b thereof. Similarly to the embodiment according to FIG. 2, each of the housings 1a, 1b is provided with a connection piece 5a, 5b and a waste gas line 4a, 4b. The two waste gas lines 4a, 4b lead into a common waste gas manifold 8. The cross sections of the waste gas lines 4a, 4b and of the waste gas manifold 8 are identical.

Figure 6:
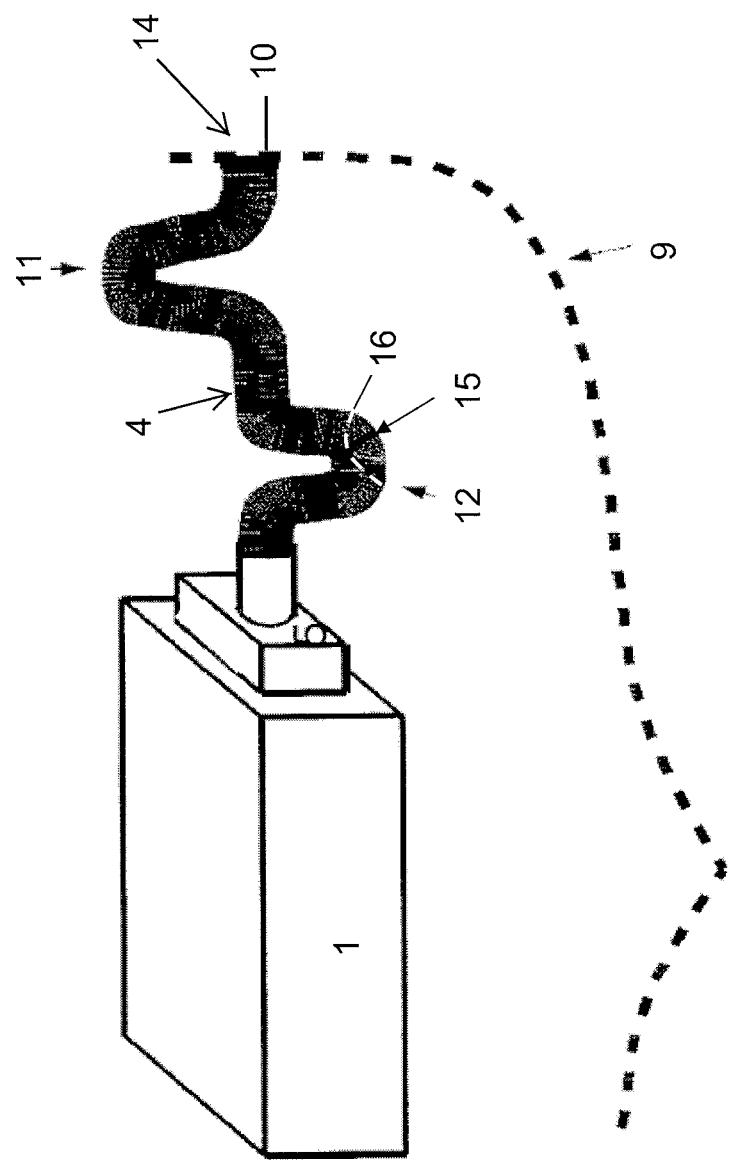
FIG. 6 shows an embodiment of the waste gas line.

FIG. 6 shows the arrangement of a battery with housing 1 in a boat 9. The gas-permeable seal and the pressure relief valve are covered by a connection piece 5. A waste gas line 4 is connected to the connection piece 5 and guides gas discharged from the battery housing 1 to an opening 10 in the hull of the boat 9. The waste gas line 4 is formed as a flexible tube, which is guided such that a portion 11 of the waste gas line 4 is located above the opening 10. Water splashing into the opening 10 and reaching the waste gas line does not run as far as the battery housing 1, but must flow upwardly into the elevated portion 11 of the waste gas line 4. Depending on how much higher than the opening 10 the portion 11 is arranged, all the kinetic energy or a large part of the kinetic energy of infiltrating water is lost, such that no water or hardly any water advances as far as the battery housing 1. A check-valve 14 may also be provided at opening 10.

A further portion 12 of the waste gas line 4 is arranged such that this is deeper than the waste gas outlet, i.e. deeper than the seal and the pressure relief valve. Any water infiltrating the waste gas line 4 or any condensing water vapour collects in this U-shaped portion 12. The portion 12 can also be provided at the deepest point thereof with a water outlet opening, such that collecting water can be discharged. A maintenance closure 16 may also be provided to close the water outlet opening 15, and may be opened to discharge water collected in the U-shaped portion 12.

The invention claimed is:

1. A boat comprising:
a battery located within an interior of a battery housing, the battery housing including a waste gas outlet comprising a gas-permeable seal and a pressure relief valve,
wherein the battery housing is gastight and watertight with the exception of the waste gas outlet,
wherein the gas-permeable seal is water-impermeable and comprises a semi-permeable diaphragm that allows the passage of water vapor out from the interior of the battery housing, but prevents the passage of water vapor into the interior of the battery housing, so as to affect pressure compensation of pressure differences between the interior of the battery housing and an environment exterior to the battery housing during normal battery operation, and
wherein the gas permeable seal and the pressure release valve together form a combined seal unit.

2. The boat of claim 1, wherein the battery comprises a lithium-ion accumulator.

3. The boat of claim 1, wherein a waste gas line is connected to the waste gas outlet, and an outlet opening of the waste gas line is located outside the boat.

4. The boat of claim 3, wherein the waste gas line comprises a flexible tube.

5. The boat of claim 1, wherein the gas-permeable seal and the pressure relief valve are arranged side by side.

6. The boat of claim 1, wherein the pressure relief valve comprises a stopper located in an opening of the battery housing and configured to be pushed out from the opening so as to thereby unblock said opening when a predefined pressure is exceeded.

7. The boat of claim 1, wherein the pressure relief valve comprises a rupture disc.

8. The boat of claim 1, wherein the battery is one of a plurality of batteries located in battery housing including respective waste gas outlets and waste gas lines, the respective waste gas lines combined in a waste manifold.

9. The boat of claim 8, wherein the cross section of the waste gas manifold and the cross sections of the waste gas lines are identical.

10. The boat of claim 3, wherein the outlet opening of the waste gas line comprises a gas-permeable and water-impermeable seal.

11. The boat of claim 3, wherein the outlet opening of the waste gas line comprises a check valve.

12. The boat of claim 3, wherein the waste gas line comprises at least one portion that is higher than the outlet opening of the waste gas line.

13. The boat of claim 3, wherein the waste gas line has at least one portion that is deeper than the waste gas outlet.

14. The boat of claim 13, wherein the portion of the waste gas line that is deeper than the waste gas outlet has a water outlet opening.

15. The boat of claim 14, wherein the water outlet opening is provided with a maintenance closure.

\* \* \* \* \*